Aug. 25, 1942.                    M. RIDER                    2,293,849
                        REFLECTOR FOR BICYCLE PEDALS
                             Filed Feb. 1, 1940
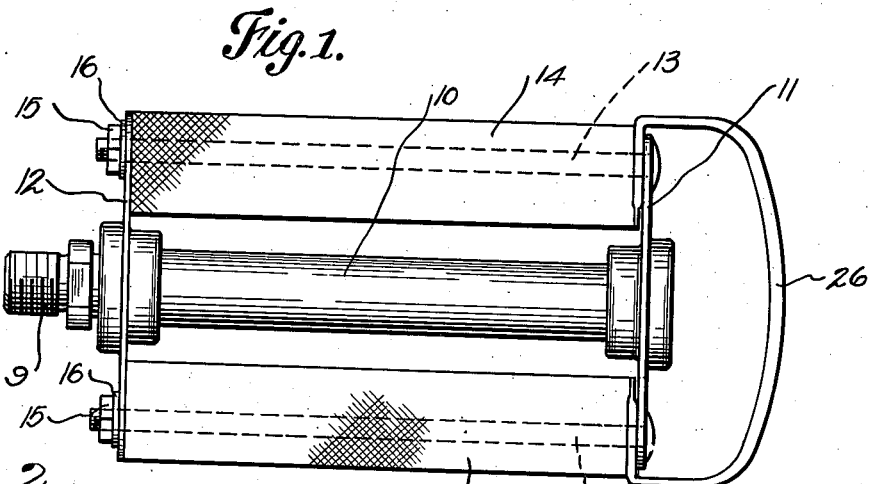
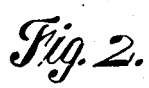
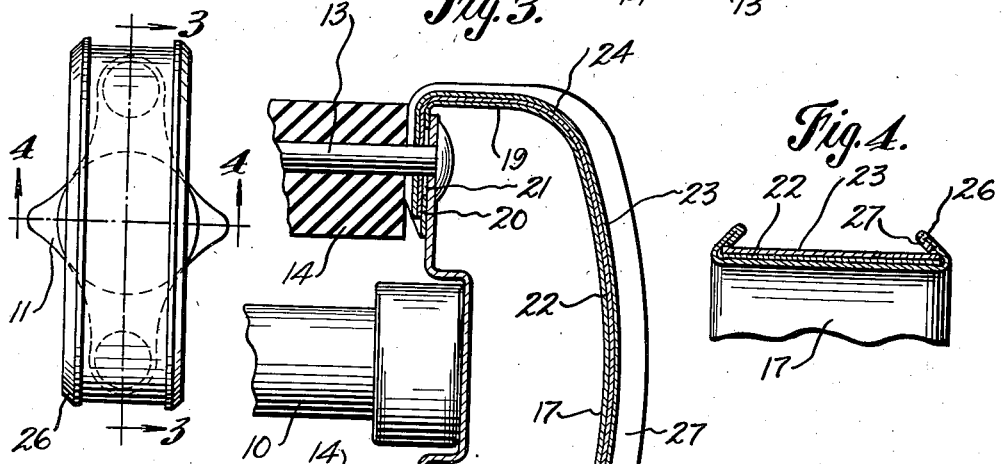
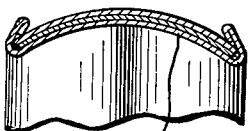
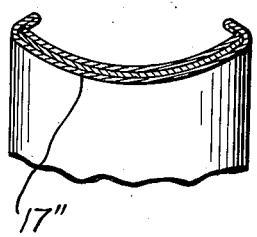
INVENTOR.
Morris Rider.
BY Patented Aug. 25, 1942

2,293,849

UNITED STATES PATENT OFFICE 2,293,849

REFLECTOR FOR BICYCLE PEDALS

Morris Rider, Detroit, Mich.

Application February 1, 1940, Serial No. 316,864

3 Claims. (Cl. 88—81)

My invention relates to a new and useful improvement in a reflector for bicycle pedals adapted to provide means whereby the rider of a bicycle may be visible at the night time to the occupants of an approaching automobile having lighted headlights whether the automobile is approaching the bicycle rider and bicycle from the rear, the front, or either side.

Another object of the invention is the provision of a reflecting device which will serve to reflect the light rays of a vehicle headlight and which may be easily and quickly mounted on a pedal of a bicycle and afford no obstruction or inconvenience to the ordinary use of the bicycle pedal.

Another object of the invention is the provision of a bicycle pedal having on its outer end face a reflecting device so arranged and constructed that the rays of a vehicle headlight striking thereagainst will be reflected therefrom so as to render the bicycle on which the pedal is mounted visible to the occupants of an automobile.

Another object of the invention is the provision of a device of this class which will be simple in structure, economical of manufacture, durable, compact, easily and quickly mounted in position and removed therefrom and which will be highly efficient in use.

Other objects will appear hereinafter.

It is recognized that various changes and modifications may be made in the detail of structure without departing from the spirit of the invention and it is intended that such variations and modifications shall be brought within the scope of the claims which form a part hereof.

Forming a part of the specification is a drawing, in which,

Fig. 1 is a side elevational view of a bicycle pedal showing the invention applied, Fig. 2 is an end elevational view of a bicycle pedal showing the invention applied, Fig. 3 is a fragmentary enlarged sectional view taken on line 3—3 of Fig. 2, Fig. 4 is a fragmentary enlarged sectional view taken on line 4—4 of Fig. 2, Fig. 5 is a fragmentary enlarged sectional view similar to Fig. 4 showing a slightly modified form of construction, and, Fig. 6 is a fragmentary sectional view similar to Fig. 4 showing a further slightly modified form of construction.

Experience has shown that bicycle riders are frequently injured by being struck by automobiles because the driver of the automobile is unable to see the bicycle rider at a sufficient distance to provide for the necessary safety. These accidents between automobiles and bicycle riders occur from vehicles approaching the bicycle from the rear, from the front, and from the side, and consequently an illuminating device which would be used by the bicycle rider as a safety device should be sufficient as to provide the necessary visibility to the occupants of vehicles approaching from these various directions. In the present invention a reflecting device has been utilized which will serve this purpose.

In the drawing I have illustrated a bicycle pedal having a supporting shaft 9 extending through a spacing sleeve 10, the spacing sleeve lying between the cross plates 11 and 12. Secured to the cross plate 11, at one of their ends, are the bolts 13 which extend through the rubber or flexible pads 14 and which also extend through the cross plate 12, nuts 15 and washers 16 being secured on these bolts 13 to retain the structure in assembled form. The frame constituting the cross plates 11 and 12, the bolts 13 and the pads 14 are rotatable freely about the shaft 9 as an axis.

This is a conventional type of bicycle pedal, various types of bicycles having pedals varying slightly in structure from that illustrated. In one form of the invention I utilize a strip, preferably formed from metal, which may be said to be formed into a U-shaped structure embodying the bight 17 and the side legs 18 and 19, each of these side legs being turned inwardly toward the other leg to provide the securing portion 20 in which is formed the elongated opening 21 for accommodating the bolt 13. When mounted in position, one face of this inwardly turned portion 20 engages against the inner face of the cross plate 11. Covering the outer face of the U-shaped structure are layers 22 and 23 of suitable light reflecting material and suitably colored. Experience has shown that Celluloid, Cellophane, or the like, may be utilized for this purpose, the layers 22 and 23 being the light reflecting members used in the invention. The outer face of the bight 17 and the outer face of the legs 18 and 19 are covered with this light reflecting material and the bight 17 proceeds into the legs 18 and 19 by a curved portion 24. It is preferred that these layers 22 or 23 be formed of colored material such as red or green so that when the light rays of a vehicle headlight strike thereon, the reflected light will be red or green. It is preferred that the reflecting device at the right hand side of the bicycle be formed green and at the left hand side be formed red, although this, of course, is optional. The pair of layers 22 and 23 is provided so that should the outer layer become damaged the inner layer is thus exposed.

In order to prevent scuffing or damaging of these layers, 22 and 23, the U-shaped structure is provided at its marginal edges with an overhanging lap or flange which is formed by bending the marginal edges inwardly of the main body as at 26 and again bending this portion 26 upon itself to provide the overlapping fold 27. Thus, there is an outwardly projecting bead or flange on the opposite edges of the U-shaped structure which serves to support the layers 22 and 23, this bead or flange extending outwardly beyond the outer face of the layers 22 or 23.

In assembling the structure, the bolts 16 are removed and the cross plate 12 is also removed with the parts which it carries. The pads 14 are then removed and the U-shaped structure is slipped over the bolts and slid downwardly and then rocked into the position illustrated, the slots 21 being of sufficient size to permit this assemblage. The pads 14 are then replaced and the cross plate 12 with its carried parts is mounted in position and the nuts 15 threaded so that the inturned edges of the layers 22 and 23 which overlie the inner face of the inwardly turned portions 20 will be semi-clamped between the portion 20 and the end of the pads 14 and the portion 20 will be semi-clamped against the end plate 11.

In use, when a bicycle embodying the invention is being used and the pedal is rotating in the normal operation of the bicycle, a moving reflecting body is thus provided from which the rays of the headlights of an approaching vehicle would be reflected. By having the legs 18 and 19 also serve as a surface for carrying reflecting medium, the bicycle may be visible if approached from either side and the curved portion 24 insures proper reflection should the bicycle be approached from an angle.

Thus, I have provided a simple and effective means whereby a bicycle ridden in the night time may be easily observed by the driver of a vehicle because of reflected light.

In the form illustrated in Fig. 1 and in Fig. 4, the outer face of the bight 17 is shown as a planar body. In Fig. 5 I have shown the outer face of the bight 17' as being formed convex. The legs 18 and 19 are formed similar to the bight 17 so that if the bight 17 is planar, the legs 18 and 19 would likewise be planar and if the bight 17' is convex or concave, these legs would, on their outer surface, be convex or concave. In Fig. 6 I have illustrated the bight 17" as being concave.

It is thus noted that there is mounted on the end face of a bicycle pedal a reflecting body which is visible because of light reflected therefrom. In the construction illustrated, I have shown a supporting structure mounted on the pedal proper. It is believed obvious that, if desired, the reflecting body may also be mounted on the outer face of the end plate 20 and the supporting structure dispensed with. However, this is a matter of choice in construction and is not believed to depart from the invention disclosed.

By having these reflecting layers 22 or 23 visible on the outer face of the pedal, an ornamental effect is also produced. The device serves to decorate the bicycle as well as provide the safety factor desired.

It is to be observed that by having the structure mounted on opposite sides of the bicycle and having the side legs and bight of the U connected by the curved portion, the structure serves as a reflector for 360 degrees.

What I claim as new is:

1. A device of the class described adapted for use with a bicycle pedal having a transversely extended end plate and comprising: a U-shaped supporting member mounted on said pedal in embracing relation to said plate and projecting outwardly therefrom and extending longitudinally across the same; a light-reflecting medium mounted on and covering the outer surface of said supporting member; and a ledge overhanging the outer face of said supporting member at opposite edges thereof and protecting said light-reflecting medium against contact with objects.

2. In combination with a bicycle pedal: a U-shaped supporting member having oppositely disposed legs and a bight, said legs and said bight being connected by a curvilinear surface; a layer of light-reflecting material covering the outer faces of said legs and said bight; and a protecting ledge projecting outwardly at opposite edges of said supporting member beyond said faces and overlying opposite edges of said layer.

3. In combination with a bicycle pedal having a transversely directed cross plate at one end thereof, a U-shaped supporting member having oppositely disposed legs and a bight, said legs and said bight being connected by a curvilinear surface, the ends of said legs being turned inwardly toward each other and positioned behind said cross plate; and a strip of light reflecting material covering the outer faces of said legs and said bight and said curvilinear surface; and means for clamping said supporting member and said light-reflecting material in position on said cross plate.

MORRIS RIDER.